United States Patent Office 3,838,109
Patented Sept. 24, 1974

3,838,109
HEAT AND FLAME RESISTANT POLYURETHANES
Michel A. Buisson and Gerard P. Repiquet, Martigues, France, assignors to Naphtachimie Societe Anonyme, Paris, France
No Drawing. Filed Oct. 16, 1972, Ser. No. 297,784
Claims priority, application France, Oct. 19, 1971, 7137415
Int. Cl. C08g 22/16, 3/00
U.S. Cl. 260—77.5 AQ
6 Claims

ABSTRACT OF THE DISCLOSURE

Heat resistant and flame resistant polyurethanes prepared by reacting organo polyisocyanates and polyhydroxyl compounds, the latter of which are produced by reaction of aliphatic ketone, formaldehyde and alkanol amine having a secondary or a primary amine function, and oxyalkylene polyhydroxyl compounds produced by condensation of alkylene oxides before reaction with the organo polyisocyanate.

---

The invention relates to a method for the preparation of heat resistant and flame resistant polyurethanes and it relates particularly to the preparation of rigid polyurethane foams.

It has previously been proposed to make flame resistant polyurethane foams from organic polyisocyanates and special polyhydroxyl compounds obtained from a reaction between phenolic compounds, formaldehyde and alkanol amines. It is generally admitted that the flame resistance imparted by these polyhydroxyl compounds is due chiefly to the aromatic nuclei of the phenolic compounds used in their preparation, since aromatic nuclei are known to limit the spread of the reaction in which the macromolecular chains, with which they are associated, are decomposed by heat.

It is an object of this invention to prepare heat resistant and flame resistant polyurethanes by means of polyhydroxyl compounds prepared solely from aliphatic compounds.

Thus the invention is essentially concerned with a method of preparing heat resistant and flame resistant polyurethanes by reacting organic polyisocyanates and polyhydroxyl compounds, in which the polyhydroxyl compounds are obtained by reaction between aliphatic ketones, formaldehyde and alkanol amines having a secondary or primary amine function.

The aliphatic ketones suitable for use in preparing the polyhydroxyl compounds are preferably selected from di-(lower alkyl) ketones of low molecular weight, such as acetone or methyl ethyl ketone.

The alkanol amines having secondary or primary amine functions, suitable for use in preparing the polyhydroxyl compounds are preferably selected from alkanol amines of low molecular weight, such as diethanol amine, dipropanol amine, monoethanol amine and monopropanol amine.

The polyhydroxyl compounds are prepared by simultaneous reaction between the aliphatic ketones, formaldehyde and alkanol amines, the various reagents advantageously being used in proportions such that:

the molecular ratio of formaldehyde to alkanol amines is within the range of 0.7 to 5 and preferably from 0.7 to 2;

the molecular ratio of formaldehyde to aliphatic ketones is at most equal to the number of hydrogen atoms bonded to the carbon atoms adjacent the carbonyl group of ketones.

For example, with acetone, which has six hydrogen atoms bonded to the carbon atoms adjacent the carbonyl group, the maximum ratio of formaldehyde to acetone would be 6.

The polyhydroxyl compounds can be easily prepared by bringing together the various reagents. These may be dissolved or dispersed in water, the water being provided e.g. in the form of an aqueous solution of one of the reagents such as formaldehyde. The reaction mixture is then heated to a temperature within the range of 80° and 140° C. so as to obtain a suitable reaction speed. The reaction temperature is generally of the order of 100° to 110° C. in which event, it takes about 1 to 3 hours. The reaction mixture is then cooled, and the water is distilled off. The compounds obtained are in the form of brownish red liquids which are moderately viscous and give an alkaline reaction.

Although the chemical structure of the polyhydroxyl compounds is not known with certainty, it is believed that the hydrogen atoms which are bonded to the carbon atoms adjacent the carbonyl group of aliphatic ketones are involved in their formation. However, it has been observed that, if the ketones are replaced with certain compounds which also have hydrogen atoms bonded to the carbon atoms adjacent a carbonyl group, satisfactory results are not obtained. Thus aromatic or cyclanic ketones such as cyclohexanone, or aliphatic esters of malonic acid are incapable of use to produce flame resistant polyurethane foams.

It has also been observed that the polyhydroxyl compounds embodying the features of this invention are made up of compounds of variable molecular weights. Some of these compunds have a fairly high molecular weight. They may be in the form of solid particles dispersed in the mass of other polyhydroxyl compounds in the liquid state. Such suspensions can be used in the preparation of polyurethane foams without the solid particles being separated.

The hydroxyl compounds thus prepared may be used for the actual manufacture of polymers, such as polyurethanes. It is, however, preferable to use them following a conversion which consists of fixing alkylene oxides, such as propylene oxide and/or ethylene oxide, onto the hydroxyl compounds. This is done by the conventional reaction in which alkylene oxides are polycondensed with compounds having reactive hydrogen. Such polycondensation can be carried out without catalyst, owing to the alkalinity of the hydroxyl compounds of this invention.

The condensates thus obtained are also in the form of brown, moderately viscous liquids having an alkaline reaction. Their hydroxyl number varies according to the hydroxyl compound initially used and the amount of alkylene oxide condensed. It has been found that condensates with a hydroxyl number within the range of 300 and 700 and preferably about 550 are particularly suitable for making rigid polyurethane foams.

Any of the organic polyisocyanates currently employed in the manufacture of polyurethanes may be used with the hydroxyl compounds of this invention. These may be selected, for example, from polymethylene-polyphenyl-isocyanate (PAPI), diphenylmethane - diisocyanate (MDI), the tolylene-diisocyanate (TDI) or the crude varieties of these polyisocyanates. Use can be made of the aforementioned compounds or mixtures thereof.

For the manufacture of rigid polyurethane foams, the various methods well known to the skilled in the art may be used, such as the prepolymer method and the single stage method. Water or preferably monofluorotrichloromethane or other Freons can be used as expanding agents. It is generally unnecessary to add a cross-linking catalyst, since the hydroxyl compounds of this invention are themselves sufficiently reactive. It is also possible to include polyols, such as polyester-polyols or polyether-polyols, in the foaming polyurethane mixes. The polyether-polyols resulting from the condensation of propylene oxide with the product of the reaction of ethylene glycol and glucose in an acid medium may advantageously be used.

The rigid polyurethane foams prepared from the hydroxyl compounds of this invention have good mechanical properties and, in particular, are non-friable. These foams are heat resistant and also self-extinguishing as measured by the ASTM standard D 1692–59 T.

EXAMPLE 1

(a) Preparation of hydroxyl compound

In a two liter reactor, which can be pressurized to 5 bars and equipped with a mechanical agitator and a means for heating and cooling by circulation of a fluid in a double jacket, the following are successively placed in the reactor at ambient temperature:

945 g. (9 moles) of diethanolamine,
270 g. (9 moles) of formaldehyde in the form of a 40% by weight aqueous solution,
182.5 g. (3.3 moles) of acetone.

The reactor is closed and the reaction mixture brought to 110° C. for two hours; the water is then distilled off in vacuo.

After the virtually complete elimination of the water, the reactor is closed, its contents are heated to 100° C. and 1,235 g. (21.3 moles) of propylene oxide are gradually introduced over a period of about 3 hours.

When the traces of propylene oxide, which have not not been fixed, have been eliminated by bubbling nitrogen therethrough, a polyhydroxyl compound with the following properties is obtained:

| | |
|---|---|
| Appearance | Dark brownish red liquid. |
| Viscosity at 25° C. | 4,000 centistokes. |
| pH (in methanol solution) | 10.9. |
| Hydroxyl number | 542. |
| N (percent by weight) | 4.8. |

(b) Manufacture of a rigid polyurethane foam

A foaming mixture is prepared from:

100 g. of the hydroxyl compound prepared in section (a)
1 g. of silicon oil
32 g. of monofluorotrichloromethane
139 g. of PAPI is then added with vigorous stirring.

The foaming mixture has a cream time of 10 seconds and an expansion time of 70 seconds.

The foam obtained has a specific gravity of 32 g./dm.$^3$. It is classed as self-extinguishing in accordance with the ASTM standard D 1692–59 T (length burned: 60 mm.).

EXAMPLE 2

(a) Preparation of a hydroxyl compound

The same procedure is used as in Example 1(a), using:

840 g. (8 moles) of diethanolamine,
240 g. (8 moles) of 40% by weight formaldehyde in aqueous solution,
232 g. (4 moles) of acetone.

When the water has been removed, 1,100 g. (19 moles) of propylene oxide is condensed therein.

The hydroxyl compound obtained has the following properties:

| | |
|---|---|
| Appearance | Dark brownish red liquid. |
| Viscosity at 25° C. | 3,000 centistokes. |
| pH (in methanol solution) | 10.9. |
| Hydroxyl number | 545. |
| N (percent by weight) | 4.6. |

(b) Manufacture of a rigid polyurethane foam

Using the polyhydroxyl compound prepared in section 2(a), a foaming mixture is prepared as in Example 1(b), with 135 g. of PAPI. The mix has a cream time of 11 seconds and an expansion time of 70 seconds.

The foam obtained has a specific gravity of 31.8 g./dm.$^3$. It is classed as self-extinguishing in accordance with the ASTM standard D 1692–59 T (length burned: 62 mm.).

EXAMPLE 3

(a) Preparation of a hydroxyl compound

The procedure of Example 1(a) is followed, using:

240 g. (8 moles) of 40% by weight formaldehyde in aqueous solution,
288 g. (4 moles) of methylethylketone,
840 g. (8 moles) of diethanolamine.

After one hour's reaction at 110° C. and removal of the water, 1,090 g. (18.8 moles) of propylene oxide is condensed with the compound obtained. The resultant hydroxyl compound has the following properties:

| | |
|---|---|
| Appearance | Dark brown liquid. |
| Viscosity at 25° C. | 1,310 centistokes. |
| pH (in methanol solution) | 10.4. |
| Hydroxyl number | 575. |
| N (percent by weight) | 4.9. |

(b) Manufacture of a rigid polyurethane foam

The procedure of Example 1(b) is followed, using the polyhydroxyl compound prepared in section 3(a) and 142 g. of MDI.

The resultant foam has a specific gravity of 33 g./dm.$^3$. It is classed as self-extinguishing in accordance with the ASTM standard D 1691–59 T (length burned: 59 mm.).

EXAMPLE 4

(a) Preparation of a hydroxyl compound

The method of Example 1(a) is followed, using:

488 g. (8 moles) of monoethanolamine,
232 g. (4 moles) of acetone,
240 g. (8 moles) of 40% by weight formaldehyde in aqueous solution, which is gradually added to the agitated mixture kept at 50° C.

After one hour's reaction at 110° C. and removal of the water formed, 1,120 g. (19.3 moles) of propylene oxide is condensed with the compound obtained.

The resultant hydroxyl compound has the following properties:

| | |
|---|---|
| Appearance | Dark brown liquid. |
| Viscosity at 25° C. | 15,000 centistokes. |
| pH (in methanol solution) | 11.9. |
| Hydroxyl number | 565. |
| N (percent by weight) | 5.5. |

(b) Manufacture of a rigid polyurethane foam

The method of Example 1(b) is followed, with 140 g. of PAPI and the polyhydroxyl compound prepared in section (4a).

The foam obtained has a specific gravity of 37 g./dm.$^3$. It is classed as self-extinguishing in accordance with the ASTM standard D 1692–59 T (burned: 46 mm.).

A polyurethane foam is prepared from the polyhydroxyl compound made in section 4(a) and 140 g. of MDI, the general conditions of preparation being the same as in Example 1(b). The foam obtained has a specific gravity 34 g./dm.$^3$. It is classed as self-extinguishing in accordance with the ASTM standard D 1692–59 T (length burned: 51 mm.).

It will be understood that changes may be made in the details of formulation and operation without departing

We claim:

1. A heat resistant and flame resistant polyurethane prepared by reaction of an organo polyisocyanate with a polyhydroxyl compound formed by reaction of di(lower alkyl) ketone, formaldehyde and a lower alkanol amine having a secondary or primary amine function at a temperature within the range of 80 to 140° C., with the molar ratio of formaldehyde to the alkanol amine being within the range of 0.7 to 5 and the molar ratio of formaldehyde to the ketone being at most equal to the number of hydrogen atoms bonded to the carbon atoms adjacent to the carbonyl group of the ketone.

2. The polyurethane as claimed in Claim 1 in which the aliphatic ketone is methyl ethyl ketone.

3. The polyurethane as claimed in Claim 1 in which the alkanol amine is selected from the group consisting of diethanol amine, dipropanol amine, monoethanol amine and monopropanol amine.

4. The polyurethane as claimed in Claim 1 in which the molecular ratio of formaldehyde to alkanol amine is within the range of 0.7 to 2 formaldehyde to 1 alkanol amine.

5. A heat resistant and flame resistant polyurethane prepared by reaction of an organo polyisocyanate with a polyhydroxyl compound formed by first reacting a di(lower alkyl) ketone, formaldehyde and a lower alkanol amine having a secondary or primary amine function at a temperature within the range of 80 to 140° C., with the molar ratio of formaldehyde to the alkanol amine being within the range of 0.7 to 5 and the molar ratio of formaldehyde to the ketone being at most equal to the number of hydrogen atoms bonded to the carbon atoms adjacent to the carbonyl group of the ketone, and then reacting the resulting product with one or more alkylene oxides to form oxyalkylene polyhydroxyl compounds having a hydroxyl number within the range of 300 to 700.

6. A heat resistant and flame resistant polyurethane prepared by reaction of an organo polyisocyanate with a polyhydroxyl compound formed by reaction of a ketone selected from the group consisting of acetone and methyl ethyl ketone, formaldehyde and a lower alkanol amine selected from the group consisting of diethanol amine, dipropanol amine, monoethanol amine and monopropanol amine, at a temperature within the range of 80 to 140° C. in the presence of water, with the molar ratio of formaldehyde to the ketone being at most equal to the number of hydrogen atoms bonded to the carbon atoms adjacent to the carbonyl group of the ketone.

References Cited
UNITED STATES PATENTS

| | | | |
|---|---|---|---|
| 3,719,615 | 3/1973 | Buisson | 260—2.5 AQ |
| 3,567,692 | 3/1971 | Haggis | 260—2.5 AM |
| 3,689,440 | 9/1972 | Glaesmann | 260—2.5 AM |
| 3,470,118 | 9/1969 | Forster | 260—2.5 AQ |
| 3,037,946 | 6/1962 | Guest | 260—77.5 AQ |

MAURICE J. WELSH, JR., Primary Examiner

C. W. IVY, Assistant Examiner

U.S. Cl. X.R.

260—2.5 AM, 2.5 AQ, 64